(12) United States Patent
Iwaguchi et al.

(10) Patent No.: US 9,874,684 B2
(45) Date of Patent: Jan. 23, 2018

(54) OPTICAL FIBER

(71) Applicant: SUMITOMO ELECTRIC INDUSTRIES, LTD., Osaka-shi, Osaka (JP)

(72) Inventors: Noriaki Iwaguchi, Yokohama (JP); Masuo Iida, Osaka (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/521,360

(22) PCT Filed: Nov. 7, 2016

(86) PCT No.: PCT/JP2016/082947
§ 371 (c)(1),
(2) Date: Apr. 24, 2017

(87) PCT Pub. No.: WO2017/082200
PCT Pub. Date: May 18, 2017

(65) Prior Publication Data
US 2017/0307815 A1    Oct. 26, 2017

(30) Foreign Application Priority Data

Nov. 9, 2015   (JP) .................. 2015-219389

(51) Int. Cl.
*G02B 6/02*    (2006.01)
*C03C 25/28*   (2006.01)
*C03C 25/10*   (2006.01)

(52) U.S. Cl.
CPC ...... *G02B 6/02395* (2013.01); *C03C 25/1055* (2013.01); *C03C 25/285* (2013.01)

(58) Field of Classification Search
None
See application file for complete search history.

(56) References Cited

U.S. PATENT DOCUMENTS

2003/0100627 A1   5/2003  Bishop et al.
2013/0330051 A1* 12/2013  Tachibana ............ G02B 6/4403
                                                        385/114

(Continued)

FOREIGN PATENT DOCUMENTS

JP   H5-271619    10/1993
JP   2001-114535   4/2001

(Continued)

*Primary Examiner* — Jerry Rahll
(74) *Attorney, Agent, or Firm* — Drinker Biddle & Reath LLP

(57) ABSTRACT

An optical fiber comprises a glass fiber, and a coating resin layer having a primary resin layer and a secondary resin layer, wherein the primary resin layer consists of a cured resin composition containing an oligomer, a monomer and a photopolymerization initiator, the oligomer is a reaction product of a specific polyol compound, a polyisocyanate compound, and a hydroxyl group-containing acrylate compound, the photopolymerization initiator includes 2,4,6-trimethylbenzoyldiphenyl phosphine and 1-hydroxycyclohexyl phenyl ketone at a mass ratio of 5:1 to 1:1, and a content of 2,4,6-trimethylbenzoyldiphenyl phosphine in the resin composition is 1.5 to 2.5% by mass.

11 Claims, 1 Drawing Sheet

(56) References Cited

U.S. PATENT DOCUMENTS

| | | | | |
|---|---|---|---|---|
| 2013/0343714 A1* | 12/2013 | Tachibana | .......... | G02B 6/02395 385/128 |
| 2013/0343717 A1* | 12/2013 | Tachibana | ................ | G02B 6/44 385/141 |
| 2014/0079362 A1* | 3/2014 | Sohma | .................... | G02B 1/04 385/123 |
| 2014/0308013 A1* | 10/2014 | Tachibana | ............. | C03C 25/106 385/100 |

FOREIGN PATENT DOCUMENTS

| | | |
|---|---|---|
| JP | 2004-292204 | 10/2004 |
| JP | 2004-354457 | 12/2004 |
| JP | 2007-256609 A | 10/2007 |
| JP | 2012-136426 | 7/2012 |
| WO | WO 01/077040 | 10/2001 |

\* cited by examiner

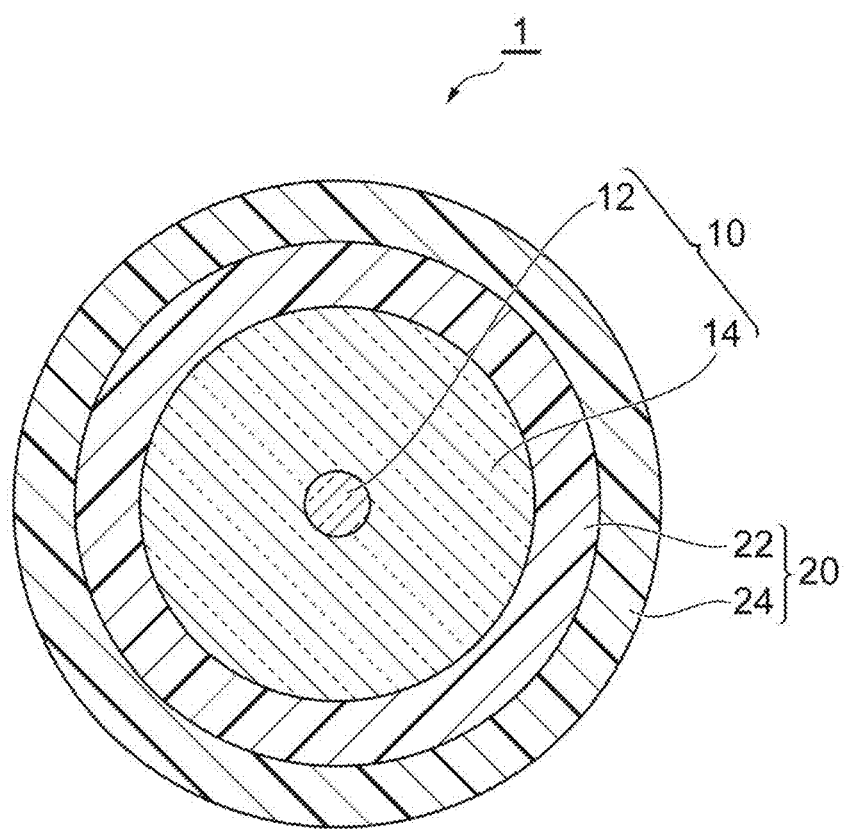

OPTICAL FIBER

TECHNICAL FIELD

The present invention relates to an optical fiber.

This application claims priority to Japanese Patent Application No. 2015-219389, filed on Nov. 9, 2015, the disclosure of which is incorporated herein by reference in its entirety.

BACKGROUND ART

In general, an optical fiber has a coating resin layer for protecting a glass fiber. The coating resin layer which is formed by curing an ultraviolet curable resin may be yellowed by heat or light. As a countermeasure to this, providing an optical fiber in which a coating resin layer consisting of an ultraviolet curable resin having excellent yellowing properties is formed has been studied in Patent Literature 1.

CITATION LIST

Patent Literature

[Patent Literature 1] JP 2007-256609 A

SUMMARY OF INVENTION

An optical fiber according to one embodiment of the present invention comprises: a glass fiber having a core and a cladding with which the core is covered, and a coating resin layer with which the glass fiber is covered, wherein the coating resin layer has a primary resin layer and a secondary resin layer, the primary resin layer consists of a cured resin composition for covering optical fibers containing an oligomer, a monomer and a photopolymerization initiator, the oligomer is a reaction product of a polyol compound having an average molecular weight of 3000 to 6000, a polyisocyanate compound including 2,4-tolylene diisocyanate or 2,6-tolylene diisocyanate, and a hydroxyl group-containing acrylate compound, the photopolymerization initiator includes 2,4,6-trimethylbenzoyldiphenyl phosphine and 1-hydroxycyclohexyl phenyl ketone at a mass ratio of 5:1 to 1:1, a content of the 2,4,6-trimethylbenzoyldiphenyl phosphine in the resin composition is 1.5 to 2.5% by mass, and a change in yellow index value between before and after irradiation with fluorescent light at a distance of 30 cm from a 30-W fluorescent lamp at room temperature for 30 days is 30 or less.

BRIEF DESCRIPTION OF DRAWINGS

FIG. 1 is a cross-sectional view illustrating one example of an optical fiber according to the present embodiment.

DESCRIPTION OF EMBODIMENTS

[Technical Problem of Disclosure]

The coating resin layer is required to have sufficient curability for protecting the glass fiber and preventing transmission loss (microbend loss) of the optical fiber.

Therefore, it is an object of the present disclosure to provide an optical fiber including a coating resin layer that has sufficient curability and is excellent in yellowing resistance and microbend loss resistance.

[Advantageous Effects of Disclosure]

According to the present disclosure, it is possible to provide an optical fiber including a coating resin layer that has sufficient curability and is excellent in yellowing resistance and microbend loss resistance.

[Description of Embodiments of the Present Invention]

First, the content of embodiments of the present invention is recited and described. The optical fiber according to one embodiment of the present invention comprises: a glass fiber having a core and a cladding with which the core is covered, and a coating resin layer with which the glass fiber is covered, wherein the coating resin layer has a primary resin layer and a secondary resin layer, and the primary resin layer consists of a cured resin composition for covering optical fibers, which will be described below.

The optical fiber of the present embodiment has excellent microbend loss resistance by having a primary resin layer that is formed using a specific resin composition for covering optical fibers.

The resin composition for covering optical fibers according to the present embodiment contains an oligomer, a monomer, and a photopolymerization initiator, wherein the oligomer is a reaction product of a polyol compound having an average molecular weight of 3000 to 6000, a polyisocyanate compound including 2,4-tolylene diisocyanate or 2,6-tolylene diisocyanate, and a hydroxyl group-containing acrylate compound, the photopolymerization initiator includes 2,4,6-trimethylbenzoyldiphenyl phosphine and 1-hydroxycyclohexyl phenyl ketone at a mass ratio of 5:1 to 2:1, and the content of 2,4,6-trimethylbenzoyldiphenyl phosphine in the resin composition is 1.5 to 2.5% by mass.

The resin composition for covering optical fibers according to the present embodiment can form a coating resin layer having sufficient curability and excellent microbend loss resistance by containing a specific oligomer as an oligomer and containing 2,4,6-trimethylbenzoyldiphenyl phosphine (hereinafter, referred to as "TPO") and 1-hydroxycyclohexyl phenyl ketone (hereinafter, referred to as "HCPK") as photopolymerization initiators at a specific ratio.

The optical fiber of the present embodiment undergoes a change in yellow index value between before and after irradiation with fluorescent light at a distance of 30 cm from a 30-W fluorescent lamp at room temperature for 30 days is 30 or less.

In the resin composition for covering optical fibers, the monomer may include a N-vinyl compound. This can further increase the curability of the coating resin layer.

The Young's modulus of the primary resin layer may be 0.7 MPa or less at 23° C. Thus, further improvement of the microbend loss resistance can be achieved.

The outer diameter of the optical fiber may be 210 μm or less, the Young's modulus of the primary resin layer may be 0.5 MPa or less at 23° C., and the Young's modulus of the secondary resin layer may be 800 MPa or more at 23° C. The outer diameter of the optical fiber may be 210 μm or less, the Young's modulus of the primary resin layer may be 0.5 MPa or less at 23° C., and the Young's modulus of the secondary resin layer may be 900 MPa or more at 23° C. or may be 1000 MPa or more. Thus, realization of good transmission characteristics of the optical fiber can be achieved while reducing the microbend loss even in the case where the coating resin layer is thinned so that the optical fiber has a small diameter.

The secondary resin layer may include a cured resin composition containing 2,4,6-trimethylbenzoyldiphenyl phosphine and 1-hydroxycyclohexyl phenyl ketone as photopolymerization initiators at a mass ratio of 1:10 to 1:20.

Thus, improvement of the curability of the secondary resin layer and more excellent microbend loss resistance can be achieved.

[Detail of Embodiments of the Present Invention]

Specific examples of a resin composition for covering optical fibers, the optical fiber, and a production method thereof according to the embodiments of the present invention are described below with reference to the drawings. It is herein intended that the present invention is not limited to such examples, is represented by the claims, and encompasses all modifications within the meaning and the scope equivalent to the claims. In the following description, the same element is represented by the same symbol in the description of the drawings, and overlapping description is omitted.

(Resin Composition for Covering Optical Fibers)

The resin composition for covering optical fibers according to the present embodiment is an ultraviolet curable resin composition containing a specific oligomer, a monomer, and a specific photopolymerization initiator.

The oligomer is urethane (meth)acrylate obtained by reaction of a polyol compound having an average molecular weight (Mw) of 3000 to 6000, a polyisocyanate compound including 2,4-tolylene diisocyanate or 2,6-tolylene diisocyanate, and a hydroxyl group-containing acrylate compound.

Examples of the polyol compound include polytetramethylene glycol, polypropylene glycol and bisphenol A-ethylene oxide adduct diol. The Mw of the polyol compound is 3000 to 6000, but it is preferable to be 3000 to 5000. Here, the Mw of the polyol compound can be measured, for example, by mass spectrometry.

The polyisocyanate compound needs only to include at least one of 2,4-tolylene diisocyanate and 2,6-tolylene diisocyanate, or may include both of them.

Examples of the hydroxyl group-containing acrylate compound include 2-hydroxyethyl (meth)acrylate, 2-hydroxybutyl (meth)acrylate, 4-hydroxybutyl (meth)acrylate, 2-hydroxypropyl (meth)acrylate, 1,6-hexanediol mono(meth)acrylate, pentaerythritol tri(meth)acrylate, and tripropylene glycol di(meth)acrylate. As an epoxy (meth)acrylate, for example, one obtained by reacting an epoxy compound and (meth)acrylic acid can be used.

The (meth)acrylate here means acrylate, or methacrylate corresponding thereto. Much the same is true on (meth)acrylic acid.

As the monomer, a monofunctional monomer having one polymerizable group or a polyfunctional monomer having two or more polymerizable groups can be used. The monomer can be used as a mixture of two or more.

Examples of the monofunctional monomer include N-vinyl compounds such as N-vinylpyrrolidone, N-vinylcaprolactam, and (meth)acryloylmorpholine; and (meth)acrylate compounds such as i sobornyl (meth)acrylate, tricyclodecanyl (meth)acrylate, benzyl (meth)acrylate, dicyclopentanyl (meth)acrylate, 2-hydroxyethyl (meth)acrylate, nonylphenyl (meth)acrylate, phenoxyethyl (meth)acrylate, and polypropylene glycol mono(meth)acrylate. Among them, N-vinyl compounds are preferable from the viewpoint of an enhancement in curing speed.

Examples of the polyfunctional monomer include polyethylene glycol di(meth)acrylate, tricyclodecanediyl dimethylene di(meth)acrylate, trimetlaylolpropane tri(meth)acrylate, ethylene oxide or propylene oxide adduct diol di(meth)acrylate of bisphenol compounds, and epoxy (meth)acrylate obtained by adding di(meth)acrylate to glycidyl ether of bisphenol compounds.

The photopolymerization initiator includes TPO and HCPK at a mass ratio of 5:1 to 1:1, where it is preferable that the mass ratio be 3:1 to 1.5:1. The content of TPO in the resin composition is 1.5 to 2.5% by mass.

The resin composition may include a silane coupling agent, an antioxidant, a photoacid generator, a photosensitizer, and the like.

(Optical Fiber)

FIG. 1 is a cross-sectional view illustrating one example of an optical fiber 1 according to the present embodiment. As illustrated in FIG. 1, the optical fiber 1 of the present embodiment comprises a glass fiber 10 that is an optical transmitter, and a coating resin layer 20.

The glass fiber 10 has a core 12 and a cladding 14, and consists of a glass member, for example, $SiO_2$ glass. The glass fiber 10 transmits light introduced to the optical fiber 1. The core 12 is provided in, for example, a region including the center axial line of the glass fiber 10. The core 12 includes pure $SiO_2$ glass, or may additionally include $GeO_2$, a fluorine element, and the like. The cladding 14 is provided in a region surrounding the core 12. The cladding 14 has a refractive index lower than the refractive index of the core 12. The cladding 14 may include pure $SiO_2$ glass, or may include $SiO_2$ glass to which a fluorine element is added.

The diameter of the glass fiber 10 is usually about 125 μm. The total thickness of the coating resin layer 20 is about 60 to 70 μm but may be smaller. It is desirable that the total thickness of the coating resin layer be 42.5 μm or less and 32.5 μm or more. The outer diameter of the optical fiber 1 is usually about 245 to 265 μm but may be 245 μm or less. In view of multi-coreization of an optical cable, the outer diameter of the optical fiber may be also 210 μm or less. For allowing the optical fiber to have a mechanical strength, the coating resin layer needs to have a certain thickness, and therefore it is desirable that the outer diameter of the optical fiber be 185 μm or more. In the case where an ink layer is provided for allowing the optical fiber to be easily distinguished, it is desirable that the outer diameter of the optical fiber excluding the ink layer be 200 μm or less and 180 μm or more.

The coating resin layer 20 has a primary resin layer 22 that is the first layer in contact with the glass fiber, and a secondary resin layer 24 that is the second layer in contact with the first layer. It is desirable that the thickness ratio of the primary resin layer and the secondary resin layer be about 1:1, but an increase in the thickness ratio of the primary resin layer facilitates the improvement of the microbend characteristics.

The thickness of the primary resin layer 22 is usually about 17.5 to 50 μm and may be 20 to 40 μm. The thickness of the secondary resin layer 24 is usually about 15 to 40 μm and may be 20 to 40 μm.

The primary resin layer 22 can be formed by curing the resin composition for covering optical fibers according to the present embodiment using ultraviolet rays. That is, the primary resin layer 22 includes a cured resin composition for covering optical fibers according to the present embodiment.

The secondary resin layer 24 can be formed, for example, by curing an ultraviolet curable resin composition (which, however, is different from the resin composition forming the primary resin layer) including an oligomer, a monomer and a photopolymerization initiator.

Examples of the oligomer include urethane (meth)acrylates. The oligomer can he used as a mixture of two or more.

The urethane (meth)acrylates include those obtained by reacting a polyol compound, a polyisocyanate compound and a hydroxyl group-containing acrylate compound. Examples of the polyol compound include polytetramethylene glycol, polypropylene glycol and bisphenol A-ethylene oxide adduct died. The polyisocyanate compound include 2,4-tolylene diisocyanate, 2,6-tolylene diisocyanate and isophorone diisocyanate. Examples of the hydroxyl group-containing acrylate compound include 2-hydroxyethyl (meth)acrylate, 2-hydroxybutyl (meth)acrylate, 4-hydroxybutyl (meth)acrylate, 2-hydroxypropyl (meth)acrylate, 1,6-hexanediol mono(meth)acrylate, pentaerythritol tri (meth)acrylate, and tripropylene glycol di(meth)acrylate.

As the monomer, a monofunctional monomer having one polymerizable group or a polyfunctional monomer having two or more polymerizable groups can be used. The monomer can be used as a mixture of two or more.

Examples of the monofunctional monomer include N-vinyl compounds such as N-vinylpyrrolidone, N-vinylcaprolactam and (meth)acryloylmorpholine; and (meth)acrylate compounds such as isobornyl (meth)acrylate, tricyclodecanyl (meth)acrylate, benzyl (meth)acrylate, dicyclopentanyl (meth)acrylate, 2-hydroxyethyl (meth)acrylate, nonylphenyl (meth)acrylate, phenoxyethyl (meth)acrylate and polypropylene glycol mono(meth)acrylate. Among them, an N-vinyl compound is preferable from the viewpoint of an enhancement in curing speed.

Examples of the polyfunctional monomer include polyethylene glycol di(meth)acrylate, hexanediol diacrylate, tricyclodecanediyl dim ethylene di(meth)acrylate, tripropylene glycol diacrylate, trimethylolpropane tri(meth)acrylate, ethylene oxide or propylene oxide adduct diol di(meth)acrylate of bisphenol compounds, and epoxy (meth)acrylate obtained by adding di(meth)acrylate to glycidyl ether of bisphenol compounds.

The photopolymerization initiator can be appropriately selected from known radical photopolymerization initiators, and used, and examples include an acyl phosphine oxide type initiator and an acetophenone type initiator.

Examples of the acyl phosphine oxide type initiator include TPO, 2,4,4-trimethylpentyl phosphine oxide and 2,4,4-trimethylbenzoyl diphenylphosphinoxide.

Examples of the acetophenone type initiator include HCPK, 2-hydroxy-2-methyl-1-phenyl-propan-1-one (produced by BASF SE, trade name "Darocure 1173"), 2,2-dimethoxy-1,2-diphenylethan-1-one (produced by BASF SE, trade name "Irgacure 651"), 2-methyl -1-(4-methylthiophenyl)-2-morpholinopropan-1-one (produced by BASF SE, trade name "Irgacure 907"), 2-benzyl-2-dimethylamino-1-(4-morpholinophenyl)-butanone-1 (produced by BASF SE, trade name "Irgacure 369"), 1-hydroxycyclohexyl phenyl ketone, 2,2-dimethoxy-2-phenylacetophenone and 1-(4-isopropylphenyl)-2-hydroxy-2-methylpropan-1-one.

It is preferable to use TPO and HCPK in combination as photoinitiators from the viewpoint of an improvement of the curability of the secondary resin layer. In this case, it is more preferable that the mass ratio of TPO to HCPK be 1:10 to 1:20.

The Young's modulus of the primary resin layer 22 is preferably 1.0 MPa or less at 23° C., more preferably 0.8 MPa or less, further preferably 0.7 MPa or less, particularly preferably 0.5 MPa or less. The lower limit of the Young's modulus of the primary resin layer 22 is not particularly limited, and is about 0.1 MPa. The Young's modulus of the secondary resin layer 24 is preferably 800 MPa or more at 23° C. and may be 900 MPa or more or 1000 MPa or more. The Young's modulus of the secondary resin layer 24 is more preferably 800 to 1200 MPa.

As the method of forming the coating resin layer 20 on the glass fiber 10, a method that has been conventionally used for production of an optical fiber can be applied.

For example, a system (wet-on-dry system) may be used in which the cladding 14 is coated with a resin composition for primary resin layer formation, the composition is cured by irradiation with ultraviolet light to form the primary resin layer 22, and thereafter the primary resin layer 22 is coated with a resin composition for secondary resin layer formation and the composition is cured by irradiation with ultraviolet light to form the secondary resin layer 24. Alternatively, a system (wet-on-wet system) may be used in which the cladding 14 is coated with a resin composition for primary resin layer formation and thereafter coated with a resin composition for secondary resin layer formation, and the compositions are simultaneously cured by irradiation with ultraviolet light to form the primary resin layer 22 and the secondary resin layer 24.

On the outer periphery surface of the secondary resin layer 24 constituting the coating resin layer 20, a colored layer that serves as an ink layer for allowing the optical fiber to be easily distinguished may be formed. The secondary resin layer may serve as the colored layer.

It is preferable that the colored layer contain a pigment from the viewpoint of an enhancement in distinguishability of the optical fiber. Examples of the pigment include coloring pigments such as carbon black, titanium oxide and zinc flower, magnetic powders such as $\gamma\text{-Fe}_2\text{O}_3$, a mixed crystal of $\gamma\text{-Fe}_2\text{O}_3$ and $\gamma\text{-Fe}_3\text{O}_4$, $\text{CrO}_2$, cobalt ferrite, iron oxide to which cobalt adheres, barium ferrite, Fe—Co and Fe—Co—Ni, and inorganic pigments such as MIO, zinc chromate, strontium chromate, aluminum tripolyphosphate, zinc, alumina, glass and mica. In addition, an organic pigment such as an azo type pigment, a phthalocyanine type pigment, or a dyeing lake pigment can also be used. The pigment may be subjected to various treatments such as surface modification and formation of a composite pigment.

(Optical Fiber ribbon)

The optical fiber of the present embodiment can be used to produce an optical fiber ribbon. The optical fiber ribbon is one in which a plurality of optical fibers are arranged in parallel and integrated by a ribbon material. The ribbon material is formed by, for example, an epoxy acrylate resin, a urethane acrylate resin or the like.

EXAMPLES

Next, the present invention is described in detail with reference to Examples, but the present invention is not limited to these Examples.

[Production of Resin Composition for Covering Optical Fibers]

(Oligomer)

Polypropylene glycol (PPG) having the average molecular weight (Mw) shown in Table 1 was allowed to react with 2,4-tolylene diisocyanate and 2-hydroxyethyl acrylate, to thereby prepare each urethane acrylate.

TABLE 1

| | Urethane acrylate | | | | |
|---|---|---|---|---|---|
| | a | b | c | d | e |
| Mw of PPG | 3500 | 3000 | 5000 | 1000 | 6500 |

(Resin Composition A1)

Resin composition A1 was prepared by mixing 85 parts by mass of urethane acrylate a as an oligomer, 3 parts by mass of polyethylene glycol diacrylate and 10 parts by mass of nonylphenyl acrylate as monomers, and 1.50 parts by mass of TPO (produced by BASF SE, trade name "Lucirin TPO") and 0.30 parts by mass of HCPK (produced by BASF SE, trade name "Irgacure 184") as photopolymerization initiators.

(Resin Composition A2)

Resin composition A2 was prepared by mixing 85 parts by mass of urethane acrylate a as an oligomer, 2.5 parts by mass of polyethylene glycol diacrylate and 9 parts by mass of nonylphenyl acrylate as monomers, and 2.50 parts by mass of TPO and 1.25 parts by mass of HCPK as photopolymerization initiators.

(Resin Composition A3)

Resin composition A3 was prepared in the same manner as in resin composition A1 except that the oligomer was changed to urethane acrylate b.

(Resin Composition A4)

Resin composition A.4 was prepared in the same manner as in resin composition A1 except that the oligomer was changed to urethane acrylate c.

(Resin Composition A5)

Resin composition A5 was prepared by mixing 85 parts by mass of urethane acrylate a as an oligomer, 3 parts by mass of polyethylene glycol diacrylate, 2 parts by mass of N-vinylcaprolactam, and 8 parts by mass of nonylphenyl (meth)acrylate as monomers, and 1.50 parts by mass of TPO and 0.30 parts by mass of HCPK as photopolymerization initiators.

(Resin Composition A6)

Resin composition A6 was prepared by mixing 85 parts by mass of urethane acrylate a as an oligomer, 3 parts by mass of polyethylene glycol diacrylate and 10 parts by mass of nonylphenyl acrylate as monomers, and 1.80 parts by mass of TPO as a photopolymerization initiator.

(Resin Composition A7)

Resin composition A7 was prepared by mixing 85 parts by mass of urethane acrylate a as an oligomer, 3 parts by mass of polyethylene glycol diacrylate and 8.5 parts by mass of nonylphenyl acrylate as monomers, and 1.50 parts by mass of TPO and 2.00 parts by mass of HCPK as photopolymerization initiators.

(Resin Composition A8)

Resin composition A8 was prepared in the same manner as in resin composition A1 except that the oligomer was changed to urethane acrylate d.

(Resin Composition A9)

Resin composition A9 was prepared in the same manner as in resin composition A1 except that the oligomer was changed to urethane acrylate e.

(Resin Composition B1)

Resin composition B1 was prepared by mixing 60 parts by mass of urethane acrylate d as an oligomer, 15 parts by mass of isobornyl acrylate, 14 parts by mass of tripropylene glycol diacrylate, and 7.8 parts by mass of epoxy (meth) acrylate as monomers, and 0.20 parts by mass of TPO and 3.00 parts by mass of HCPK as photopolymerization initiators.

(Resin Composition B2)

Resin composition B2 was prepared by mixing 60 parts by mass of urethane acrylate d as an oligomer, 15 parts by mass of isobornyl acrylate, 15 parts by mass of tripropylene glycol diacrylate, and 7.8 parts by mass of epoxy (meth) acrylate as monomers, and 0.20 parts by mass of TPO and 2.00 parts by mass of HCPK as photopolymerization initiators.

(Resin Composition B3)

Resin composition B3 was prepared by mixing 60 parts by mass of urethane acrylate d as an oligomer, 15 parts by mass of isobornyl acrylate, 15 parts by mass of tripropylene glycol diacrylate, and 7.9 parts by mass of epoxy (meth) acrylate as monomers, and 0.10 parts by mass of TPO and 2.00 parts by mass of HCPK as photopolymerization initiators.

(Resin Composition B4)

The molecular weight of the urethane acrylate included in resin composition B1 was adjusted, to prepare resin composition B4 for forming a secondary resin layer having a Young's modulus of 800 MPa.

(Resin Composition B5)

The molecular weight of the urethane acrylate included in resin composition B1 was adjusted, to prepare resin composition B5 for forming a secondary resin layer having a Young's modulus of 900 MPa.

[Optical Fiber]

Example 1

A primary resin layer having a thickness of 35 µm was formed on the outer periphery of a glass fiber having a diameter of 125 µM, the fiber being configured from a core and a cladding, by use of resin composition A1, and a secondary resin layer having a thickness of 30 vim was further formed on the outer periphery of the resultant by use of resin composition B1, to obtain an optical fiber having a diameter of 245 µm. The linear velocity was 1500 m/min.

Example 2

An optical fiber was obtained by the same operation as in Example 1 except that the primary resin layer was formed by use of resin composition A2.

Example 3

An optical fiber was obtained by the same operation as in Example 1 except that the primary resin layer was formed by use of resin composition A3.

Example 4

An optical fiber was obtained by the same operation as in Example 1 except that the primary resin layer was formed by use of resin composition A4.

Example 5

An optical fiber was obtained by the same operation as in Example 1 except that the primary resin layer was formed by use of resin composition A5.

Example 6

An optical fiber was obtained by the same operation as in Example 1 except that the secondary resin layer was formed by use of resin composition B2.

Example 7

An optical fiber was obtained by the same operation as in Example 1 except that the secondary resin layer was formed by use of resin composition B3.

Example 8

A primary resin layer having a thickness of 17.5 µm was formed on the outer periphery of a glass fiber having a diameter of 125 µm, the fiber being configured from a core and a cladding, by use of resin composition A4, and a secondary resin layer having a thickness of 1.7.5 µm was further formed on the outer periphery of the resultant by use of resin composition B4, to obtain an optical fiber having a diameter of 195 µm. The linear velocity was 1500 m/min.

Example 9

A primary resin layer having a thickness of 20 μm was formed on the outer periphery of a glass fiber having a diameter of 125 μm, the fiber being configured from a core and a cladding, by use of resin composition A4, and a secondary resin layer having a thickness of 15 μm was further formed on the outer periphery of the resultant by use of resin composition B4, to obtain an optical fiber having a diameter of 195 μm. The linear velocity was 1500 m/min.

Example 10

A primary resin layer having a thickness of 17.5 μm was formed on the outer periphery of a glass fiber having a diameter of 125 μm, the fiber being configured from a core and a cladding, by use of resin composition A4, and a secondary resin layer having a thickness of 17.5 μm was further formed on the outer periphery of the resultant by use of resin composition B5, to obtain an optical fiber having a diameter of 195 μm. The linear velocity was 1500 m/min.

Comparative Example 1

An optical fiber was obtained by the same operation as in Example 1 except that the primary resin layer was formed by use of resin composition A6.

Comparative Example 2

An optical fiber was obtained by the same operation as in Example 1 except that the primary resin layer was formed by use of resin composition A7.

Comparative Example 3

An optical fiber was obtained by the same operation as in Example 1 except that the primary resin layer was formed by use of resin composition A8.

Comparative Example 4

An optical fiber was obtained by the same operation as in Example 1 except that the primary resin layer was formed by use of resin composition A9.

[Evaluation]

Each of the optical fibers produced was evaluated as follows. The evaluation results are shown in Table 2.

(Curability)

The curability of the primary resin layer and the secondary resin layer was checked by extracting uncured components. First, the secondary resin layer was scraped off from the optical fiber having a length of 1 m, the scraped secondary resin layer was immersed in methyl ethyl ketone at 60° C. for 17 hours, the amount of substances having a molecular weight of 1000 or less out of the obtained extract was determined using a gas chromatograph mass spectrometer, and the amount was divided by the weight of the scraped secondary resin layer, to determine the percentage of components having a molecular weight of more than 1000. Next, the glass fiber was pulled out of the remaining primary resin layer, the primary resin layer was taken out, and the percentage of components having a molecular weight of more than 1000 was determined by the same operation as in the secondary resin layer.

(Peeling)

The optical fiber having a length of 10 in was put into a groove with a V-shaped cross section, an acrylic resin plate having a length of 10 m was placed on the optical fiber, and a 2-kg weight was placed further on the acrylic resin plate for one minute. Thereafter, the optical fiber was taken out, and the cross section was observed using a microscope, to observe the presence of peeling of the primary resin layer from the glass fiber.

(Young's Modulus)

The Young's modulus of the primary resin layer of the optical fiber at a normal temperature (23° C.) was measured by the Pullout Modulus (POM) method. Two positions of the optical fiber were secured by two chuck devices, and a coating resin layer portion between the two chuck devices was removed. Next, one of the chuck devices was secured, and the other of the chuck devices was moderately moved towards the opposite direction of the chuck device secured. When the length of a portion of the optical fiber, the portion being sandwiched by the chuck device to be moved, was designated as L, the amount of movement of the chuck was designated as Z, the outer diameter of the primary resin layer was designated as Dp, the outer diameter of the glass fiber was designated as Df, the Poisson's ratio of the primary resin layer was designated as n and the load in movement of the chuck device was designated as W, the Young's modulus of the primary resin layer (POM value) was determined from the following expression.

$$\text{Young's modulus (MPa)} = ((1+n)W/\pi LZ) \times 1n\ (Dp/Df)$$

The Young's modulus of the secondary resin layer at 23° C. was measured by pulling the glass portion out of the optical fiber and subjecting the coating resin layer to a tensile tester.

(Yellowing Properties)

The yellowing properties were measured as follows. First, 40 optical fibers having a length of 5 cm were arranged in the width direction to produce an optical fiber plate, and two plates of the optical fiber were stacked so that each longitudinal direction of the plates formed a nearly right angle, and the yellow index (YI) value was measured using a spectrocolorimeter SE-2000 (produced by Nippon Denshoku Industries Co., Ltd.). Next, each of the two optical fiber plates was arranged at a distance of 30 cm under a 30-W fluorescent lamp so that the surface of the optical fiber plate should be irradiated with fluorescent light, and after the optical fiber plates were allowed to stand still at room temperature for 30 days, the optical fiber plates were stacked so that the surfaces irradiated with fluorescent light faced upward and each longitudinal direction of the plates formed a nearly right angle, to measure the YI value. The changed amount ΔYI in YI values between before and after the irradiation with the fluorescent light was calculated, and it was determined as OK when ΔY1 was 30 or less and as NG when ΔY1 was more than 30.

(Microbead Characteristics)

The difference Δα1 obtained by subtracting, from the value of the transmission loss at a wavelength of 1550 nm when the optical fiber was wound around a bobbin which had a diameter of 280 mm and whose surface was covered with sandpaper, the value of the transmission loss at a wavelength of 1550 nm when the optical fiber was wound around a bobbin which had a diameter of 280 mm and whose surface was not covered with sandpaper was evaluated by the following criteria.

Δα1<0.3 dB/km: A 0.3≤Δα1<0.5 dB/km: B

Δα1>0.5 dB/km: C

TABLE 2

| | Primary resin layer | | | Secondary resin layer | Coating resin layer | |
|---|---|---|---|---|---|---|
| | Curability (% by mass) | Peeling | Young's modulus (MPa) | Curability (% by mass) | Yellowing properties | Microbend characteristics |
| Example 1 | 86 | Absent | 0.52 | 95 | OK | B |
| Example 2 | 88 | Absent | 0.66 | 95 | OK | B |
| Example 3 | 86 | Absent | 0.50 | 95 | OK | A |
| Example 4 | 85 | Absent | 0.41 | 95 | OK | A |
| Example 5 | 86 | Absent | 0.50 | 95 | OK | A |
| Example 6 | 87 | Absent | 0.60 | 94 | OK | B |
| Example 7 | 89 | Absent | 0.70 | 93 | OK | B |
| Example 8 | 85 | Absent | 0.41 | 95 | OK | B |
| Example 9 | 85 | Absent | 0.41 | 95 | OK | A |
| Example 10 | 85 | Absent | 0.41 | 95 | OK | A |
| Comparative Example 1 | 84 | Present | 0.29 | 95 | OK | A |
| Comparative Example 2 | 90 | Absent | 0.80 | 95 | NG | C |
| Comparative Example 3 | 90 | Absent | 0.81 | 95 | OK | C |
| Comparative Example 4 | 84 | Present | 0.28 | 95 | OK | A |

It could be confirmed that the optical fiber produced in Examples shows sufficient curability in the coating resin layer, and excellent yellowing resistance and microbend loss resistance.

REFERENCE SIGNS LIST

1: optical fiber, 10: glass fiber, 12: core, 14: cladding, 20: coating resin layer, 22: primary resin layer, 24: secondary resin layer.

The invention claimed is:

1. An optical fiber comprising:
a glass fiber having a core and a cladding with which the core is covered, and a coating resin layer with which the glass fiber is covered, wherein
the coating resin layer has a primary resin layer and a secondary resin layer,
the primary resin layer consists of a cured resin composition for covering optical fibers containing an oligomer, a monomer and a photopolymerization initiator,
the oligomer is a reaction product of a polyol compound having an average molecular weight of 3000 to 6000, a polyisocyanate compound including 2,4-tolylene diisocyanate or 2,6-tolylene diisocyanate, and a hydroxyl group-containing acrylate compound,
the photopolymerization initiator includes 2,4,6-trimethylbenzoyldiphenyl phosphine and 1-hydroxycyclohexyl phenyl ketone at a mass ratio of 5:1 to 1:1,
a content of the 2,4,6-trimethylbenzoyldiphenyl phosphine in the resin composition is 1.5 to 2.5% by mass, and
a change in yellow index value between before and after irradiation with fluorescent light at a distance of 30 cm from a 30-W fluorescent lamp at room temperature for 30 days is 30 or less.

2. The optical fiber according to claim 1, wherein the monomer includes an N-vinyl compound.

3. The optical fiber according to claim 1, wherein a Young's modulus of the primary resin layer is 0.7 MPa or less at 23° C.

4. The optical fiber according to claim 1, wherein an outer diameter is 210 μm or less,
a Young's modulus of the primary resin layer is 0.5 MPa or less at 23° C., and
a Young's modulus of the secondary resin layer is 800 MPa or more at 23° C.

5. The optical fiber according to claim 4, wherein a Young's modulus of the secondary resin layer is 900 MPa or more at 23° C.

6. The optical fiber according to claim 4, wherein a Young's modulus of the secondary resin layer is 1000 MPa or more at 23° C.

7. The optical fiber according to claim 1, wherein the secondary resin layer includes a cured resin composition containing 2,4,6-trimethylbenzoyldiphenyl phosphine and 1-hydroxycyclohexyl phenyl ketone as photopolymerization initiators at a mass ratio of 1:10 to 1:20.

8. The optical fiber according to claim 2, wherein a Young's modulus of the primary resin layer is 0.7 MPa or less at 23° C.

9. The optical fiber according to claim 2, wherein an outer diameter is 210 μm or less,
a Young's modulus of the primary resin layer is 0.5 MPa or less at 23° C., and
a Young's modulus of the secondary resin layer is 800 MPa or more at 23° C.

10. The optical fiber according to claim 9, wherein a Young's modulus of the secondary resin layer is 900 MPa or more at 23° C.

11. The optical fiber according to claim 9, wherein a Young's modulus of the secondary resin layer is 1000 MPa or more at 23° C.

* * * * *